United States Patent
Bouchez et al.

(10) Patent No.: US 7,516,993 B2
(45) Date of Patent: Apr. 14, 2009

(54) LOCALLY-DEFORMABLE VEHICLE BUMPER SHOCK ABSORBER

(75) Inventors: Emilie Bouchez, Le Plessis Hebert (FR); Laurent Delmas, Vernon (FR); Thierry Renault, Vernon (FR)

(73) Assignee: Cadence Innovation, Saint Marcel (FR)

( * ) Notice: Subject to any disclaimer, the term of this patent is extended or adjusted under 35 U.S.C. 154(b) by 0 days.

(21) Appl. No.: 10/573,360

(22) PCT Filed: Sep. 27, 2004

(86) PCT No.: PCT/FR2004/002433

§ 371 (c)(1),
(2), (4) Date: Dec. 8, 2006

(87) PCT Pub. No.: WO2005/030533

PCT Pub. Date: Apr. 7, 2005

(65) Prior Publication Data

US 2007/0187958 A1    Aug. 16, 2007

(30) Foreign Application Priority Data

Sep. 26, 2003    (FR) .................................. 03 11292

(51) Int. Cl.
*B60R 19/03* (2006.01)

(52) U.S. Cl. ..................................................... 293/120

(58) Field of Classification Search .......... 293/120–122
See application file for complete search history.

(56) References Cited

U.S. PATENT DOCUMENTS

| 3,933,387 | A | * | 1/1976 | Salloum et al. ............. 293/120 |
| 4,186,915 | A | * | 2/1980 | Zeller et al. ................. 267/140 |
| 5,290,078 | A | * | 3/1994 | Bayer et al. ................. 293/120 |
| 5,425,561 | A | | 6/1995 | Morgan |
| 5,507,540 | A | | 4/1996 | Pernot |
| 6,082,792 | A | | 7/2000 | Evans et al. |
| 6,290,272 | B1 | | 9/2001 | Braun |
| 6,406,081 | B1 | | 6/2002 | Mahfet et al. |

FOREIGN PATENT DOCUMENTS

FR    2 817 815    6/2002

* cited by examiner

*Primary Examiner*—Dennis H Pedder
(74) *Attorney, Agent, or Firm*—Blakely, Sokoloff, Taylor & Zafman LLP

(57) ABSTRACT

The invention relates to a shock absorber (6) for the bumper (2) of a vehicle. The inventive absorber comprises: a support (12), and strips (32, 34) which extend forward from the support and which are equipped with a face (38) that is directed toward the interior of the absorber. In addition, the invention comprises one opening (36) for each strip, said opening extending opposite the aforementioned face (38) and opening onto the exterior of the absorber.

9 Claims, 3 Drawing Sheets

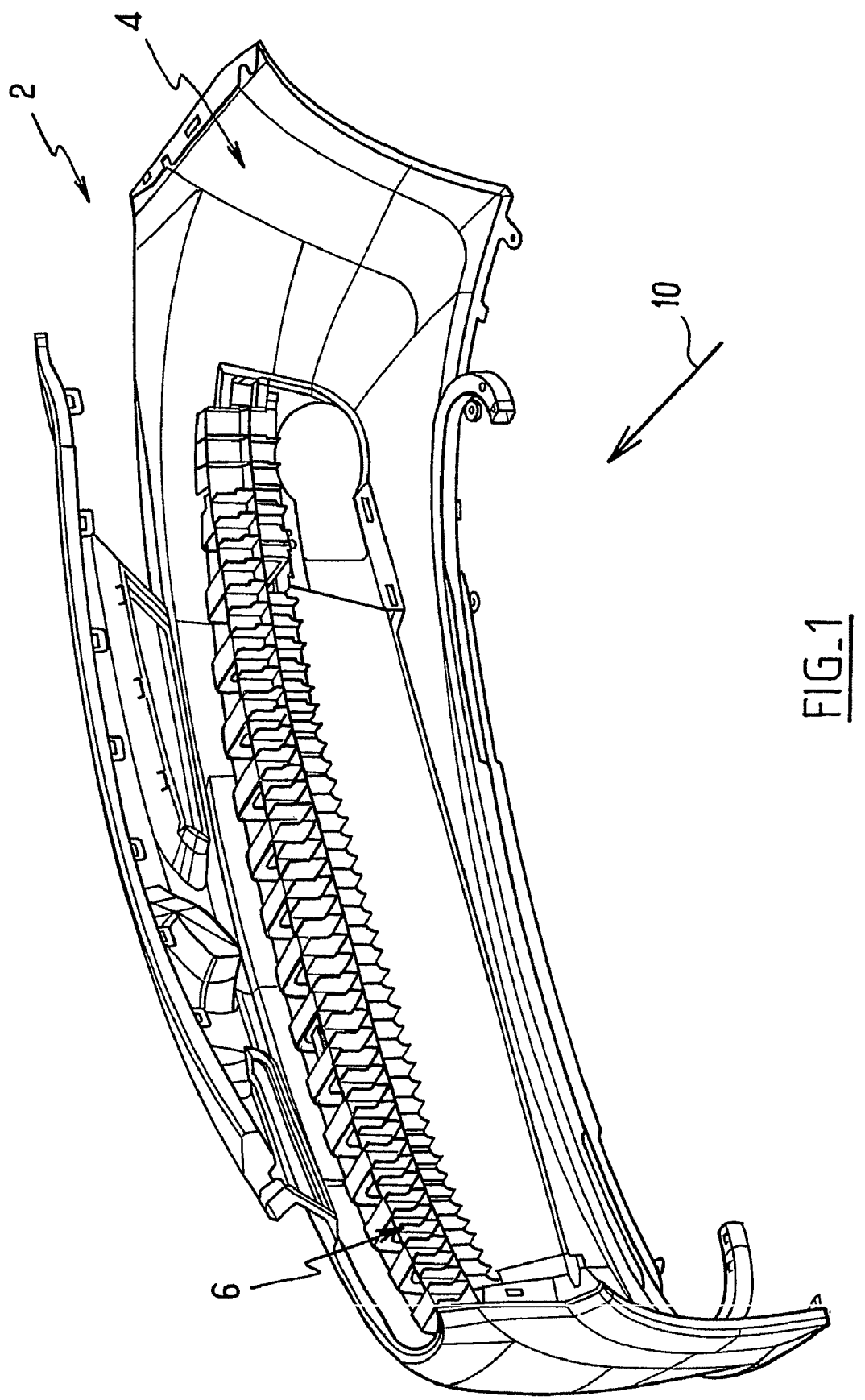
FIG_1

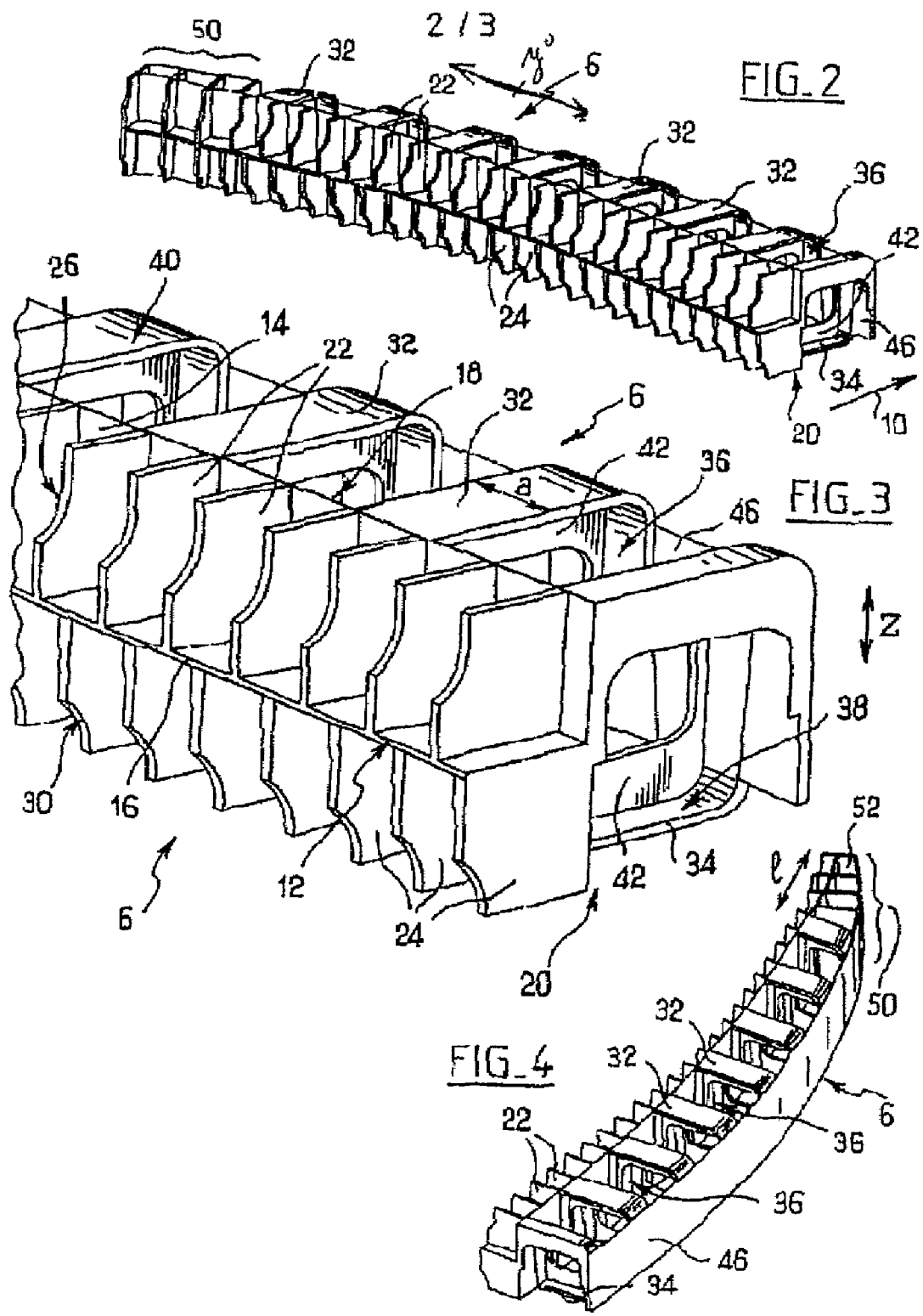

LOCALLY-DEFORMABLE VEHICLE BUMPER SHOCK ABSORBER the present patent application is a non-provisional application of International Application No. PCT/FR 2004/002433, filed Sep.27, 2004.

The invention relates to vehicle bumpers and to the manufacturing method thereof.

It is known how to position behind the bumper skin of a vehicle and in front of the actual beam a shock absorber notably for absorbing the energy of low speed impacts. Such an arrangement is for example disclosed in document DE-198 61 026.

Today bumpers of vehicles should be compliant with different standards defined by regulations. These standards refer back to different types of impacts called pedestrian impacts, low speed impacts and Danner impacts defined elsewhere and which will not be presented in detail here.

In addition to satisfactorily passing the tests relative to each of these impacts, the bumper should preferably comply with the following constraints:
  have respect for the design of the vehicle;
  effectively absorb the energy of the impact as soon as possible during the impact;
  allow the absorber to be simply attached to the bumper;
  allow electrical cables to be integrated into the bumper;
  and finally perform satisfactorily between −20° and +40° C.

An object of the invention is therefore to provide a bumper which performs satisfactorily during the aforementioned impacts and meets these different constraints as far as possible.

For this purpose, according to the invention an absorber for vehicle bumpers is provided, comprising:
  a support; and
  strips extending forwards from the support and which have a face that is directed towards the interior of the absorber, the absorber having for each strip, one opening extending opposite the face and opening onto the exterior of the absorber.

Thus, the strips located in the area of the impact may very easily deform in order to absorb a significant portion of the energy of the impact. This energy is absorbed all the more efficiently since these strips away from the area of the impact will generally not be deformed.

The absorber according to the invention may further have at least any one of the following characteristics:
  the face being a first face, each strip has a second face directed towards the exterior of the absorber;
  each strip is planar;
  each strip extends in a horizontal plane;
  each strip extends from only one of the lower and upper halves of the support;
  each strip extends from a longitudinal edge of the support;
  the strips extend from one of the upper and lower halves of the support, alternating along the supports;
  each strip comprises a strengthening rib;
  it has at each longitudinal end, an end area, with a greater length than one larger width of the strips;
  each end area is without any strip;
  each end area is arranged so as to have greater stiffness with regards to impact from the front, than any area of the absorber provided with strips;
  each end area has vertical ribs;
  it has a front wall in contact with the strips and extending in front of the latter;
  the support comprises a vertical wall from which the strips extend;
  the support is arranged so as to exhibit greater stiffness with regards to impact from the front, than any area of the absorber provided with strips;
  the support comprises ribs;
  the support comprises a horizontal wall; and
  it is arranged so as to be wholly manufactured by moulding between two mould portions, mobile relatively to each other.

According to the invention a vehicle bumper comprising an absorber according to the invention is also provided.

According to the invention, a method for manufacturing an absorber according to the invention is further provided, the absorber being manufactured by moulding.

Advantageously, the absorber is moulded between two mould portions, mobile relatively to each other along a direction corresponding to the vertical direction of the absorber.

More advantageously, the whole of the absorber is moulded by means of two mould portions, mobile relatively to each other.

Other features, objects and advantages of the invention will become further apparent in the following description of a preferred embodiment, given as a non-limiting example, with reference to the appended drawings wherein:

FIG. 1 is a perspective view of a bumper according to the invention showing the bumper skin and the absorber;

FIGS. 2 and 4 are perspective views of the left half of the absorber of FIG. 1;

FIG. 3 is a larger scale view of a portion of the absorber of FIG. 2;

Figure 5:
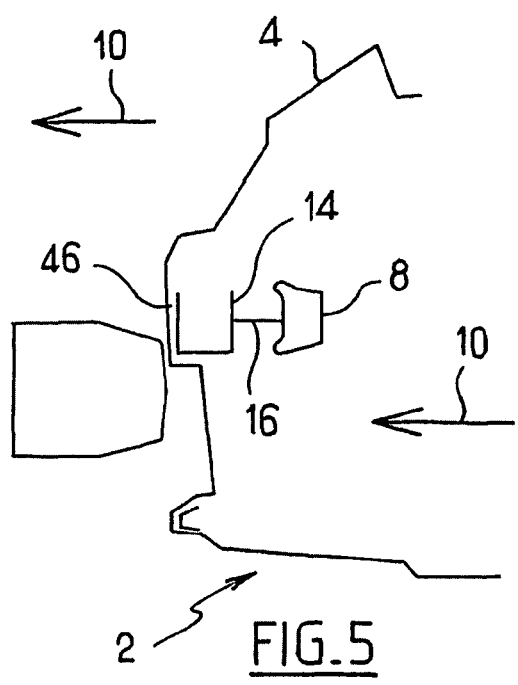
FIGS. 5 and 6 are two schematic sectional views along a middle longitudinal vertical plane showing the performance of the bumper of FIG. 1 during a low speed impact test, respectively before and at the end of the impact.

A bumper according to a preferred embodiment of the invention is illustrated in FIG. 1.

The bumper 2 comprises a bumper skin 4 as well as an absorber 6. The bumper further comprises a beam 8, not shown in FIG. 1, but illustrated in FIGS. 5-8. The absorber 6 extends behind the skin 4 and in front of the beam 8 with reference to the direction and forward moving direction of the vehicle illustrated by the arrow 10 in the figures.

The absorber 6 will now be described in detail, with reference to FIGS. 1-4. The absorber 6 is a single plastic part. It extends from one end to the other of the beam 8 and over the major portion of the skin 4.

The absorber 6 has a support 12 comprising a substantially plane vertical wall 14 but generally having a curve like the absorber 6, in a horizontal plane corresponding to the general curve of the front of the vehicle. The support 12 comprises a horizontal plane wall 16 extending from the rear of the wall 14, rearwards, at half distance from the upper 18 and lower 20 edges of the wall 14 and which follows the curve of the portion 8.

The support comprises ribs 22, 24 distributed in two networks located above and below the rear wall 16 respectively. Each rib 22, 24 is planar, vertical and parallel to the running direction 10 of the vehicle. The ribs of each network extend parallel with each other and at a distance from each other. Nevertheless, the ribs 22 of the upper network do not coincide with the ribs 24 of the lower network. They are staggered with the latter so that the foot of each rib 22 of the upper network extends at half distance from the foot of both ribs 24, the closest to the lower network, and vice versa. Each rib has a substantially rectangular shape. The rear upper corner of each rib of the upper network is cut into by a circular arc cut 26, the curvature centre of which is located outside the rib. The rear lower corner 30 of the ribs of the lower network is cut into, in a similar way. In this way, the absorber fits into the shape of the beam. Each rib is in contact with the walls 14 and 16.

At the front of the support 18, the absorber 6 comprises two series of horizontal planar strips 32, 34. The strips 32 of the upper series extend from the edge 18 of the wall 14 whereas the strips 34 of the lower series extend from the edge 20 of this wall. The strips of each series are separated and distant from one another. The strips of each series are coplanar with each other. In the same way as for the ribs 22, 24, the strips of the upper series are shifted with respect to the strips of the lower series. Knowing that the strips of each series provide between them openings 36, as a result each strip 32 of the upper series extends facing an opening 36 provided between the strips 34 of the lower series. Also, the strips 34 of the lower series each extend facing an opening 36 provided between the strips of the upper series. Each of the strips 32, 34 therefore has an internal face 38 extending facing one of the openings 36, which opens onto the exterior of the absorber. Each of the internal faces 38 is directed towards the interior of the absorber.

Each strip further has an external face 40 opposite to the face 38 and directed towards the exterior of the absorber.

Taking into account this staggered arrangement, when one examines the absorber along its longitudinal direction, the strips extend from the lower edge and from the upper edge of the wall 14, alternating spatially.

In the present example, the absorber comprises for each strip 32, 34, a strengthening rib 42 with a vertical planar shape and parallel to the running direction 10. The rib extends from the internal face 38 of the strip in the direction of the opposite opening 36.

The absorber 6 comprises a single common front wall 46 extending in front of the strips 32, 34. The front end of each of these strips is curved in order to continuously rejoin the upper or lower longitudinal edge of the wall. Also, each rib 42 extends up to the internal face of the wall 46.

At each longitudinal end of the absorber, an end area 50 without any strips is found having a length I along the longitudinal direction of the absorber, larger than the largest width of the strips measured along the same direction. Each end area 50 is arranged in order to exhibit greater stiffness with regards to impact from the front, than any of the areas of the absorber provided with strips. The walls 14, 16 and 46 extend up into the end areas 50 as well as the ribs 22 and 24. On the other end, the strips y are replaced with vertical strips 52 similar to strips 22 and 24.

If the portion extending behind the wall 14 is designated as the rear portion of the absorber, and the portion extending in front of the wall 14 is designated as the front portion, it is found that the rear portion has greater stiffness than the front portion.

Figure 6:
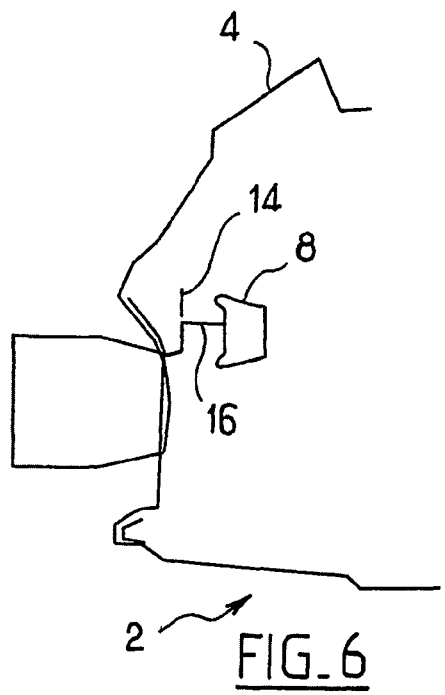
Figure 7:
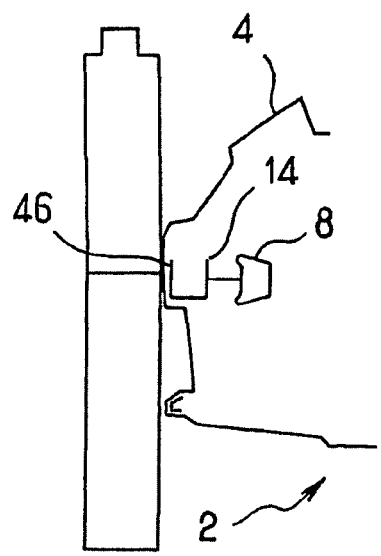
FIGS. 7 and 8 are views similar to FIGS. 5 and 6 relating to a pedestrian impact.
Figure 8:
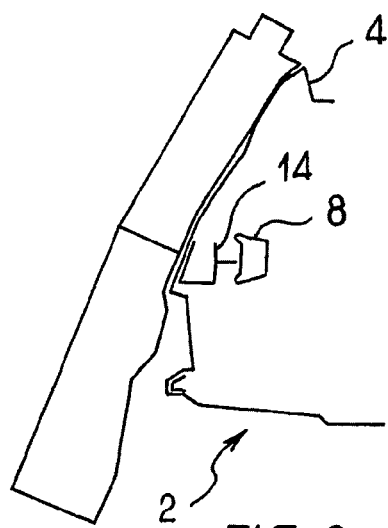

The performance of the absorber is illustrated in FIGS. 5 and 6 during a low speed impact, FIG. 5 shows the bumper before the impact and FIG. 6 shows the bumper at the end of the impact. Also, its performance is illustrated for a pedestrian impact in FIGS. 7 and 8. The views corresponding to FIGS. 5-8 are sections corresponding to the y0 section of the vehicle, i.e., the middle vertical longitudinal plane of the latter.

Each of the strips with the corresponding rib 42 forms an absorber unit. Knowing that the pedestrian impact requires that the absorber should be relatively soft in the front portion to minimize the acceleration caused by the impact on the leg, this arrangement makes the front portion of the absorber sufficiently flexible. Of course, the stiffness of the strips may be adjusted by acting on its shape or its dimensions as well as on that of the associated rib.

On the other hand, the low speed impact, as tested by means of an impactor with a width of 600 mm, causes a larger surface of the absorber to operate and therefore many more absorber units. The stiffness of the rear portion of the absorber provides limitation of the intrusion of the impactor upon such an impact. This stiffness is imparted by two networks of ribs 22, 24.

The absorber 6 is located facing the bumper beam and its axis of symmetry is the same as the one of the beam so as not to destabilize the whole of the bumper during the Danner impact. Moreover the distribution between the flexible portion and the stiff portion may be adjusted according to the position of the stiff low support further provided in the bumper, in order to minimize the bending angle of the knee. The end areas 50 where only the low speed impact is applied have a shape which makes them very stiff, which limits intrusion during corner impacts.

The results show that the absorber may meet the requirements in pedestrian impact and low speed impact. Moreover, the bumper has a satisfactory performance during a Danner impact.

Figure 9:
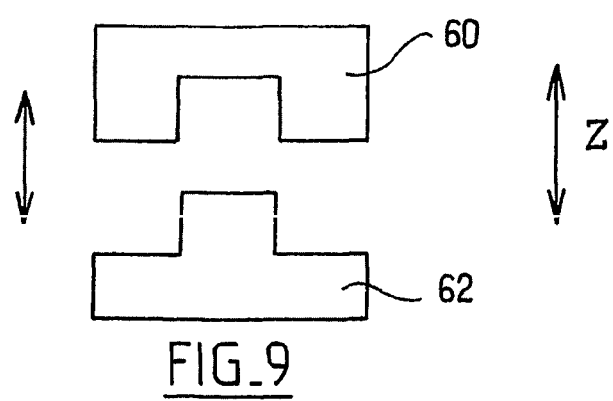
FIG. 9 is a schematic view of a mould for manufacturing the absorber of FIG. 2.

The absorber 6 is manufactured by injection moulding of a thermoplastic material. One of the advantages of the absorber as just described is that it may be wholly moulded by means of two mould portions 60 and 62, as schematically illustrated in FIG. 9 and mobile relative to each other along a vertical direction Z corresponding to the vertical direction of the absorber and of the vehicle, once the absorber is installed in the vehicle.

Of course, many modifications may be provided to the invention without departing from the scope thereof. Thus, the shape, the arrangement and the dimensions of each portion of the absorber may be altered.

Without necessarily providing for each strip, an aperture opening onto the exterior of the absorber and extending opposite to the internal face of the strip, an absorber for vehicle bumpers may be provided, comprising a support and planar strips distant from each other and extending from the support forwards, each strip extending in a horizontal plane.

Also, independently of this position of the opening or even of the extension of each strip in a horizontal plane, an absorber for vehicle bumpers may be provided, comprising a support and strips extending forwards from the support, the absorber being arranged so as to be wholly manufactured by moulding between two mould portions mobile relative to each other.

Similarly, independently of these characteristics, a method for manufacturing an absorber for vehicle bumpers, comprising a support and strips extending forwards from the support, may be provided wherein the whole of the absorber is moulded by means of two mould portions mobile relative to each other.

Provision may be made for positioning an absorber in the lower portion of the bumper by adjusting the dimensions of the strips to the stiffness required in this area.

The invention claimed is:
1. An absorber (6) for vehicle bumper (2), comprising:
a support (12) having an upper half and a lower half; and
strips (32, 34) extending forwards from the support and having a first face (38) directed towards the interior of the absorber, wherein each strip has an opening (36)

extending opposite the first face (38) and opening onto the exterior of the absorber, wherein each strip (32, 34) extends from a longitudinal edge (18, 20) of the support (12), wherein each strip (32, 34) has a second face (40) directed towards the exterior of the absorber, is planar, and extends in a horizonal plane from only one of the lower and upper halves of the support (12).

2. The absorber according to claim 1, wherein the strips (32, 34) extend from one of the upper and lower halves of the support 12, alternating along the support.

3. The absorber according to claim 1, further comprising a strengthening rib (42) for each strip (32, 34).

4. The absorber according to claim 1, further comprising a front wall (46) in contact with the strips (32, 34).

5. The absorber according to claim 1, wherein the support (12) comprises a vertical wall (14) from which extend the strips.

6. The absorber according to claim 1, wherein the support (12) is arranged so as to exhibit greater stiffness with regards to impact from the front than any area of the absorber provided with strips.

7. The absorber according to claim 1, wherein the support (12) comprises ribs (22, 24).

8. The absorber according to claim 1, wherein the support (12) comprises a horizontal wall (16).

9. The absorber according to claim 1, wherein the absorber comprises two mould portions (60, 62) which are mobile relative to each other.

* * * * *